(12) United States Patent
Kung (10) Patent No.: US 8,733,177 B2
(45) Date of Patent: May 27, 2014

(54) SENSING DEVICE AND SENSING METHOD FOR SENSING MULTIPLE DIMENSIONAL FORCE

(75) Inventor: Chen-Pang Kung, Zhongli (TW)

(73) Assignee: Industrial Technology Research Institute, Hsinchu (TW)

( * ) Notice: Subject to any disclaimer, the term of this patent is extended or adjusted under 35 U.S.C. 154(b) by 152 days.

(21) Appl. No.: 13/407,498

(22) Filed: Feb. 28, 2012

(65) Prior Publication Data
US 2013/0056354 A1 Mar. 7, 2013

(30) Foreign Application Priority Data

Sep. 7, 2011 (TW) .............................. 100132295 A (51) Int. Cl.
*G01B 7/16* (2006.01)
(52) U.S. Cl.
USPC ....................................... 73/780; 73/862.626
(58) Field of Classification Search
USPC .................. 73/760, 780, 862.626; 74/862.626
See application file for complete search history.

(56) References Cited

U.S. PATENT DOCUMENTS

| | | | |
|---|---|---|---|
| 4,503,705 A * | 3/1985 | Polchaninoff | 73/172 |
| 4,644,801 A * | 2/1987 | Kustanovich | 73/862.046 |
| 6,151,967 A * | 11/2000 | McIntosh et al. | 73/514.32 |
| 6,689,948 B2 * | 2/2004 | Raisanen | 84/733 |
| 7,199,302 B2 * | 4/2007 | Raisanen | 84/723 |
| 7,712,373 B2 * | 5/2010 | Nagle et al. | 73/780 |
| 2010/0162832 A1 | 7/2010 | Brauers | |
| 2012/0137791 A1 * | 6/2012 | Kung et al. | 73/862.626 |

OTHER PUBLICATIONS

Eaton et al., "Planar Surface-Micromachined Pressure Sensor with a Sub-Surface, Embedded Reference Pressure Cavity," Micromachined Devices and Components, Proceedings of the SPIE, vol. 2882, Austin, TX, Oct. 14-15, 1996, pp. 1-8.
Tseng et al., "Polymer-MEMS Based Fabry-Perot Shear Stress Sensor," Submitted to IEEE Sensors Journal, Feb. 15, 2002, pp. 1-25.
Wang et al., "A shear and plantar pressure sensor based on fiber-optic bend loss," Journal of Rehabilitation Research & Development, vol. 42, N. 3, May/Jun. 2005, pp. 315-326.
Sekitani et al., "A Rubberlike Stretchable Active Matrix Using Elastic Conductors," Science, vol. 321, Sep. 12, 2008, pp. 1468-1472.

* cited by examiner

*Primary Examiner* — Max Noori
(74) *Attorney, Agent, or Firm* — Muncy, Geissler, Olds & Lowe, P.C.

(57) ABSTRACT

Sensing device and sensing method are disclosed. The multi-dimensional force sensing device includes a soft laminose dielectric structure, a conductive sheet, at least one first electrode sheet, at least one second electrode sheet, a measuring unit and an analysis unit. The soft laminose dielectric structure has a first surface and a second surface opposite to each other. The conductive sheet is disposed on the first surface and has a vertical projection area. The first electrode sheet is disposed on the second surface and totally in the range of the vertical projection area. The second electrode sheet is disposed on the second surface and partially in the range of the vertical projection area. The analysis unit analyzes the magnitude and direction of a force applied on the conductive sheet according to the capacitance between the at least one first electrode sheet and between the first and the second electrode sheets.

22 Claims, 8 Drawing Sheets

SENSING DEVICE AND SENSING METHOD FOR SENSING MULTIPLE DIMENSIONAL FORCE

This application claims the benefit of Taiwan application Serial No. 100132295, filed Sep. 7, 2011, the disclosure of which is incorporated by reference herein in its entirety.

BACKGROUND

1. Technical Field

The disclosed embodiments relate in general to a sensing device and a sensing method for sensing a multi-dimensional force.

2. Description of the Related Art

Along with the advance in technology, various force sensing devices are provided. In the example of touch button, the user can send an instruction by pressing or touching the touch type button, which has now been widely used in various home appliances or computer peripheral products.

In the example of touch panel, the user can send an instruction by pressing or touching the touch panel, which has been widely used in cell phones and notebook computers.

However, both the touch button and the touch panel can only detect whether the user has touched the button or the panel, and the areas of application are narrow. In terms of the current areas of application, the touch button or the touch panel, at most, can only be used as an input interface to an electronic device.

SUMMARY

The disclosure is directed to a multi-dimensional force sensing device.

According to one embodiment, a multi-dimensional force sensing device is provided. The multi-dimensional force sensing device includes a soft laminose dielectric structure, a conductive sheet, at least one first electrode sheet, at least one second electrode sheet, a measuring unit and an analysis unit. The soft laminose dielectric structure has a first surface and a second surface opposite to each other. The conductive sheet is disposed on the first surface and has a vertical projection area. The first electrode sheet is disposed on the second surface and totally disposed in the range of the vertical projection area. The second electrode sheet is disposed on the second surface and partially disposed in the range of the vertical projection area. The measuring unit is used for measuring the capacitances generated between the at least one first electrode sheet and between the first electrode sheet and the second electrode sheet. The analysis unit is for analyzing the magnitude and direction of a force applied on the conductive sheet according to the capacitances generated between the first electrode sheets and between the first electrode sheets and the second electrode sheets.

According to another embodiment, a multi-dimensional force sensing device is provided. The multi-dimensional force sensing device includes a soft upper cover, a conductive sheet, a substrate, at least one first electrode sheet, at least one second electrode sheet, a measuring unit and an analysis unit. At least one groove is formed on a first surface of the soft upper cover. The conductive sheet, disposed on a bottom of the groove having a vertical projection area. The substrate is attached on the soft upper cover. The first electrode sheet is disposed between the substrate and the soft upper cover and totally disposed in the range of the vertical projection area. The second electrode sheet is disposed between the substrate and the soft upper cover and partially disposed in the range of the vertical projection area. The measuring unit is used for measuring the capacitances generated between the first electrode sheet and the second electrode sheet. The analysis unit is used for analyzing the magnitude and direction of a force applied on the conductive sheet according to the capacitances generated between the first electrode sheet and the second electrode sheet.

According to an alternative embodiment, a multi-dimensional force sensing device is provided. The multi-dimensional force sensing device includes a soft laminose dielectric structure, a conductive sheet, a substrate, at least one first electrode sheet, at least one second electrode sheet, a measuring unit and an analysis unit. The soft laminose dielectric structure has a first surface and a second surface opposite to each other. The conductive sheet, disposed on the first surface, has a vertical projection area. The substrate is attached on a second surface. The first electrode sheet, disposed on a surface of the substrate, is disposed between the substrate and the soft laminose dielectric structure and is totally disposed in the range of the vertical projection area. The second electrode sheet, disposed on the surface of the substrate, is disposed between the substrate and the soft laminose dielectric structure and is partially disposed in the range of the vertical projection area. The measuring unit is used for measuring the capacitance generated between the first electrode sheet and the second electrode sheet. The analysis unit is used for analyzing the magnitude and direction of a force applied on the conductive sheet according to the capacitances generated between the first electrode sheet and the second electrode sheet.

According to another alternative embodiment, a multi-dimensional force sensing method is provided. The multi-dimensional force sensing method includes the following steps. A multi-dimensional sensing device is provided. The multi-dimensional force sensing device includes a soft laminose dielectric structure, a conductive sheet, at least one first electrode sheet and at least one second electrode sheet. The soft laminose dielectric structure has a first surface and a second surface opposite to each other. The conductive sheet is disposed on the first surface and has a vertical projection area. The first electrode sheet is disposed on the second surface and totally disposed in the range of the vertical projection area. The second electrode sheet is disposed on the second surface and partially disposed in the range of the vertical projection area. The capacitances generated between the at least one first electrode sheets and between the first electrode sheet and the adjacent second electrode sheet are measured. A micro-processor analyzes the magnitude and direction of a force applied on the conductive sheet according to the capacitance generated between the at least one first electrode sheets and between the first electrode sheet and the adjacent second electrode sheet.

The above and other aspects of the invention will become better understood with regard to the following detailed description of the preferred but non-limiting embodiment(s). The following description is made with reference to the accompanying drawings.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

First Embodiment

Figure 1:
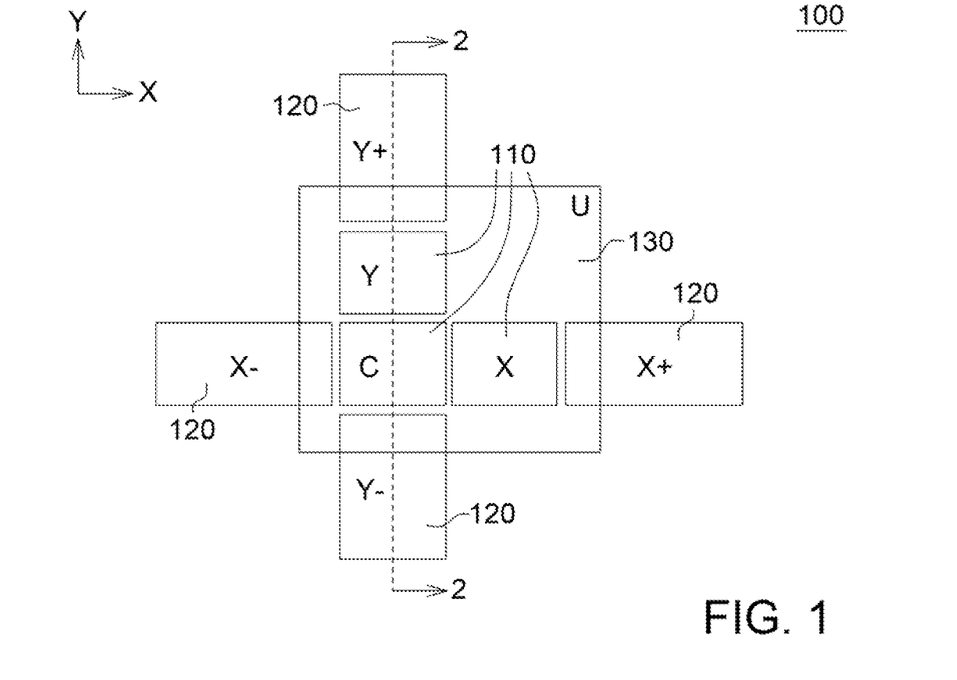
FIG. 1 shows a top view of a multi-dimensional force sensing device according to a first embodiment.
Figure 2:
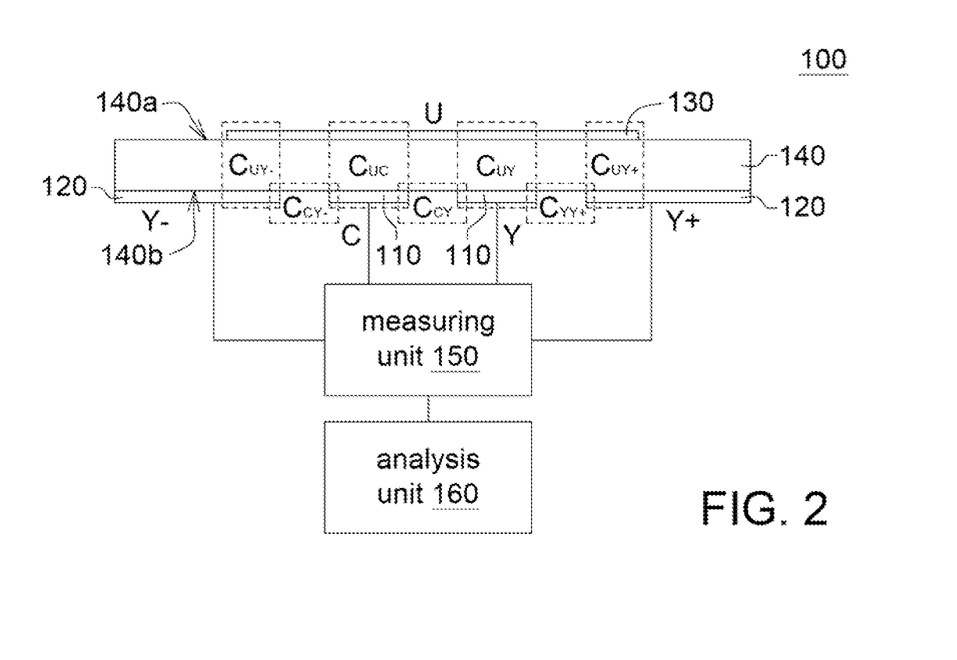
FIG. 2 shows a cross-sectional view of the multi-dimensional force sensing device of FIG. 1 viewed along a cross-sectional line 2-2.

Referring to FIGS. 1 to 2. FIG. 1 shows a top view of a multi-dimensional force sensing device 100 according to a first embodiment. FIG. 2 shows a cross-sectional view of the multi-dimensional force sensing device 100 of FIG. 1 viewed along a cross-sectional line 2-2. The multi-dimensional force sensing device 100 includes a soft laminose dielectric structure 140 (illustrated in FIG. 2), a conductive sheet 130, three first electrode sheets 110, four second electrode sheets 120, a measuring unit 150 (illustrated in FIG. 2) and an analysis unit 160 (illustrated in FIG. 2). As indicated in FIG. 2, the soft laminose dielectric structure 140 has a first surface 140a and a second surface 140b opposite to each other. The conductive sheet 130 is disposed on the first surface 140a. The first electrode sheet 110 and the second electrode sheet 120 are disposed on the second surface 140b. In the present embodiment of the disclosure, the number of first electrode sheets 110 is exemplified by 3, but in other embodiments, the number of first electrode sheets 110 can also be 1, 2, 4 or more than 4. The number of the second electrode sheet 120 is exemplified by 4, but in other embodiments, the number of second electrode sheets 120 can also be 1, 2, 3, 4 or more than 4.

In FIG. 1, the conductive sheet 130 is disposed atop, and the first electrode sheet 110 and the second electrode sheet 120 are disposed underneath the conductive sheet 130.

In terms of position relationships, the four second electrode sheets 120 of the present embodiment of the disclosure are all disposed at outside the first electrode sheets 110 and around the first electrode sheets 110. The first electrode sheet 110 designated as "Y", the second electrode sheet 120 designated as "Y+", the second electrode sheet 120 designated as "Y-" and the first electrode sheet 110 designated as "C" are arranged in the Y-axis direction. The first electrode sheet 110 designated as "X", the second electrode sheet 120 designated as "X-", the second electrode sheet 120 designated as "X+" and the first electrode sheet 110 designated as "C" are arranged in the X-axis direction. There is no overlapping between the first electrode sheets 110 and the second electrode sheets 120.

In terms of overlapping relationship, the conductive sheet 130 has a vertical projection area, the first electrode sheets 110 are totally disposed in the range of the vertical projection area of the conductive sheet 130, and each second electrode sheet 120 is partially disposed in the range of the vertical projection area of the conductive sheet 130.

The conductive sheet 130 is not connected to any voltage. In one embodiment, when the measuring unit 150 is used for measuring the capacitance between two first electrode sheets 110, a signal is applied between the two first electrode sheets. In another embodiment, when the measuring unit 150 is used for measuring the capacitance between the first electrode sheet 110 and the second electrode sheet 120, a signal is applied between the first electrode sheet 110 and the second electrode sheet 120. There are many implementations for applying a signal to measure capacitances. For example, whether to apply a voltage or a current is determined according to actual needs, and the disclosure does not impose further restrictions.

The measuring unit 150, used for measuring various capacitances between the first electrode sheets 110 and between the first electrode sheet 110 and the second electrode sheet 120, is realized by such as a capacitance sensor. In the present embodiment of the disclosure, the measuring unit 150 is used for measuring the capacitance (such as the capacitance Ccy of FIG. 2) between the first electrode sheets 110, and the capacitances (such as the capacitances Cyy+ and Ccy– of FIG. 2) between the first electrode sheet 110 and the adjacent second electrode sheet 120. Wherein the capacitance Ccy denotes the capacitance measured between the first electrode sheet 110 designated as "C" and the first electrode sheet 110 designated as "Y", and the designation of remaining capacitances can be deduced by analogy.

The analysis unit 160 (illustrated in FIG. 2) analyzes the magnitude and direction of a force applied on the conductive sheet 110 according to the capacitance (such as the capacitance Ccy of FIG. 2) between the first electrode sheets 110 and the capacitances (such as the capacitances Cyy+ and Ccy– of FIG. 2) between the first electrode sheet 110 and the adjacent second electrode sheet 120. The analysis unit 160 is realized by such as a micro-processor, a firmware circuit or a storage medium storing several programming codes. The processes of sensing a multi-dimensional force by a multi-dimensional sensing device 100 through the use of the above elements are elaborated below with accompanying drawings and flowcharts.

Figure 3:
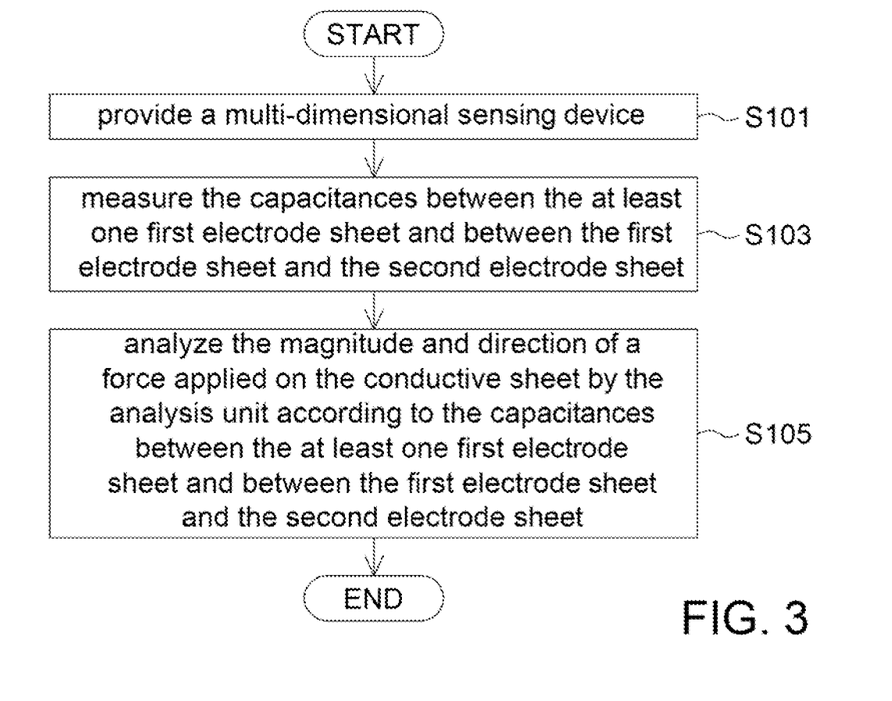
FIG. 3 shows a flowchart of a multi-dimensional force sensing method according to a first embodiment.

Referring to FIG. 3, a flowchart of a multi-dimensional force sensing method according to a first embodiment is shown. The disclosure is exemplified by the multi-dimensional force sensing device 100 of FIG. 1. However, anyone who is skilled in the technology of the disclosure will understand that the application of the multi-dimensional force sensing method of the present embodiment of the disclosure is not limited to the multi-dimensional force sensing device 100 of FIG. 1, and the application of the multi-dimensional force sensing device 100 is not limited to the multi-dimensional force sensing method of FIG. 3.

In step S101, the multi-dimensional sensing device 100 is provided.

In step S103, the capacitances (such as the capacitances Ccy, Cyy+ and Ccy– of FIG. 2) between the first electrode sheets 110 and between the first electrode sheet 110 and the second electrode sheet 120 are measured by the measuring unit 150.

In step S105, the magnitude and direction of the force applied on the conductive sheet 110 is analyzed by the analysis unit 160 (such as a micro-processor) according to the capacitances (such as the capacitances Ccy, Cyy+, and Ccy− of FIG. 2) between the first electrode sheets 110 and between the first electrode sheet 110 and the second electrode sheet 120.

Figure 4:
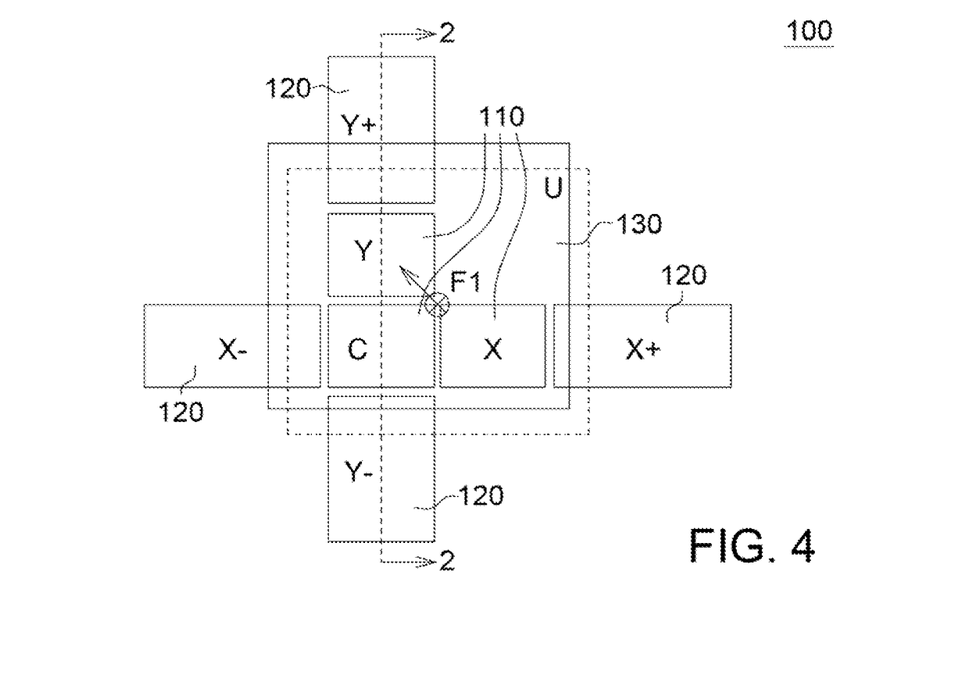
FIG. 4 shows a schematic diagram of the conductive sheet of FIG. 1 applied a force.

Referring to FIG. 4, a schematic diagram of the conductive sheet of FIG. 1 applied a force F1 is shown. When the force F1 is applied in the left top direction, the relationship between the conductive sheet 130, the first electrode sheets 110 and the second electrode sheets 120 will change. When the force F1 is applied to the multi-dimensional force sensing device 100, the force F1 is divided into a vertical component force F11 and a horizontal component force F12 (illustrated in FIG. 5). The vertical component force F11 changes the vertical distance D1 (illustrated in FIG. 5) between the conductive sheet 130 and the first and the second electrode sheets 110 and 120. The horizontal component force F12 changes the overlapping relationship between the conductive sheet 130 and the second electrode sheets 120.

Figure 5:
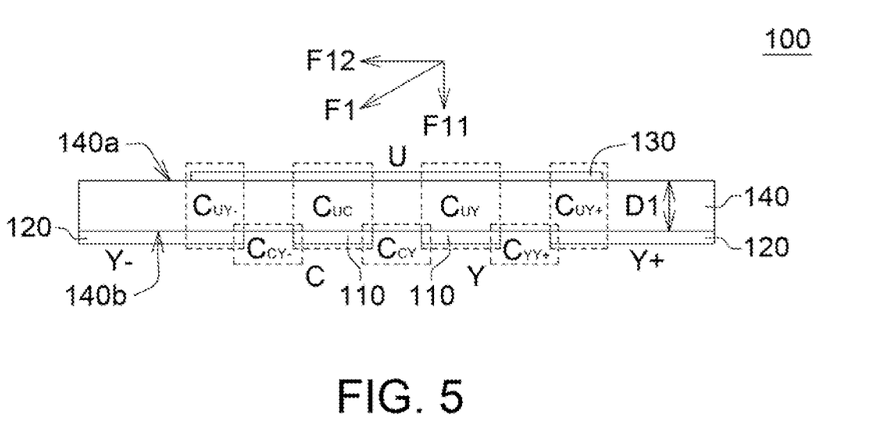
FIG. 5 shows a cross-sectional view of the multi-dimensional force sensing device of FIG. 4 viewed along a cross-sectional line 2-2.
Figure 6:
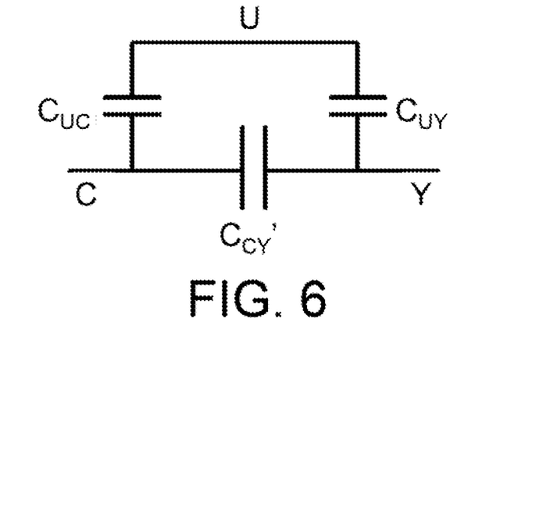
FIG. 6 shows an equivalent circuit diagram of the capacitance generated between the first electrode sheets of FIG. 5.

Let the capacitance Ccy of FIG. 2 be taken for example. Referring to FIGS. 5 and 6. FIG. 5 shows a cross-sectional view of the multi-dimensional force sensing device 100 of FIG. 4 viewed along a cross-sectional line 2-2. FIG. 6 shows an equivalent circuit diagram of the capacitance Ccy generated between the first electrode sheets 110 of FIG. 5. The capacitance Ccy denotes the capacitance between the first electrode sheet 110 designated as "C" and the first electrode sheet 110 designated as "Y". The capacitance Ccy' denotes the original capacitance between the first electrode sheet 110 designated as "C" and the first electrode sheet 110 designated as "Y". The capacitance Cuc denotes the capacitance between the conductive sheet 130 designated as "U" and the first electrode sheet 110 designated as "C". The capacitance Cuy denotes the capacitance between the conductive sheet 130 designated as "U" and the first electrode sheet 110 designated as "Y". The capacitance Cuy+ denotes the conductive sheet 130 designated as "U" and the second electrode sheet 120 designated as "Y+". The capacitance Cuy− denotes the capacitance between the conductive sheet 130 designated as "U" and the second electrode sheet 120 designated as "Y−". Based on the serial connection and parallel connection, the relationship between the capacitance Ccy and the capacitances Ccy', Cuc and Cuy is expressed as formula (1):

$$Ccy = Ccy' + \left( \frac{1}{\frac{1}{Cuc} + \frac{1}{Cuy}} \right) \quad (1)$$

As indicated in FIG. 5 and FIG. 6, the vertical component force F11 causes changes to the vertical distance between the conductive sheet 130 and the first electrode sheets 110 and the vertical distance D1 between the conductive sheet 130 and the second electrode sheets 120, and accordingly affects the capacitances (such as the capacitances Cuc and Cuy of FIG. 5) between the conductive sheet 130 and the first electrode sheets 110 and the capacitance (such as the capacitance Ccy of FIG. 5) between the first electrode sheets 110. The horizontal component force F12 causes a horizontal displacement to the conductive sheet 130 as indicated in FIGS. 4 and 5. The displaced conductive sheet 130 still totally covers the first electrode sheets 110. The horizontal component force F12 does not cause change to the capacitance (such as the capacitance Ccy of FIG. 5) between the first electrode sheets 110. Therefore, the measuring unit 150 measures the capacitance (such as the capacitance Ccy of FIG. 5) between the first electrode sheets 110, and the analysis unit 160 judges the variation in the magnitude of the vertical component force F11 according to the variation in capacitance (such as the capacitance Ccy of FIG. 5). Despite the above descriptions are exemplified by the capacitances in the Y-axis direction, the capacitances in the X-axis direction can also be analyzed according to similar processes.

Figure 7:
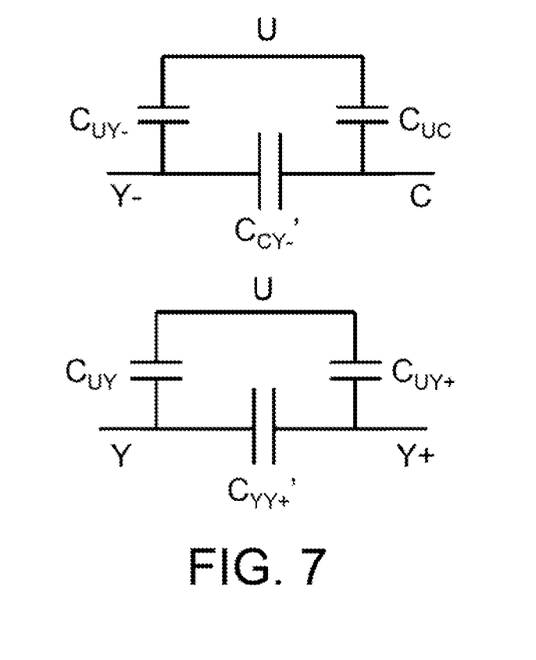
FIG. 7 shows an equivalent circuit diagram of the capacitance generated between the first electrode sheet and the second electrode sheet of FIG. 5.

Similar changes will occur to the capacitances (such as the capacitances Cyy+ and Ccy− of FIG. 5) between the first electrode sheets 110 and the second electrode sheets 120. Referring to FIGS. 5 and 7. FIG. 7 shows an equivalent circuit diagram of the capacitances Ccy− and Cyy+ between the first electrode sheets 110 and the second electrode sheets 120. As indicated in FIGS. 5 and 7, the vertical component force F11 causes changes to the vertical distance between the conductive sheet 130 and the first electrode sheets 110 and the vertical distance D1 between the conductive sheet 130 and the second electrode sheets 120, and accordingly affects the capacitances (such as the capacitances Cuc and Cuy of FIG. 5) between the conductive sheet 130 and the first electrode sheets 110 and the capacitances (such as the capacitances Cuy− and Cuy+ of FIG. 5) between the conductive sheet 130 and the second electrode sheets 120 and the capacitances (such as the capacitances Ccy− and Cyy+ of FIG. 5) between the first electrode sheets 110 and the second electrode sheets 120. The horizontal component force F12 causes a horizontal displacement to the conductive sheet 130, and the horizontal displacement changes the overlapping area between the vertical projection area of the conductive sheet 130 and the second electrode sheet 120. Also, the variation in the overlapping area changes the capacitances (such as the capacitances Cuy+ and Cuy− of FIG. 5) between the conductive sheet 130 and the second electrode sheets 120, and accordingly affects the capacitances (such as the capacitances Ccy− and Cyy+ of FIG. 5) between the first electrode sheets 110 and the second electrode sheets 120. The vertical component force F11 is obtained from the variation in capacitance (such as the capacitance Ccy of FIG. 5) between the first electrode sheets 110. Therefore, the measuring unit 150 measures the capacitance (such as the capacitance Ccy− or Cyy+ of FIG. 5) between the first electrode sheets 110 and the second electrode sheets 120, and the analysis unit 160 estimates the magnitude and direction of the horizontal component force F12 according to the measured capacitances (such as the capacitances Ccy, Ccy−, and Cyy+ of FIG. 5).

Wherein, the capacitance Ccy− denotes the capacitance between the first electrode sheet 110 designated as "C" and the second electrode sheet 120 designated as "Y−"; the capacitance Ccy−' denotes the original capacitance between the first electrode sheet 110 designated as "C" and the second electrode sheet 120 designated as "Y−"; the capacitance Ccy− denotes the capacitance between the first electrode sheet 110 designated as "C" and the second electrode sheet 120 designated as "Y−"; the capacitance Cuc denotes the capacitance between the conductive sheet 130 designated as "U" and the first electrode sheet 110 designated as "C". Based on the serial connection and parallel connection, the relationship between the capacitance Ccy and the capacitances Ccy', Cuy− and Cuc is expressed as formula (2):

$$Ccy-= Ccy-' + \left( \frac{1}{\frac{1}{Cuy-} + \frac{1}{Cuc}} \right) \quad (2)$$

Wherein, the capacitance Cyy+ denotes the capacitance between the first electrode sheet 110 designated as "Y" and the second electrode sheet 120 designated as "Y+"; the capacitance Cyy+' denotes the original capacitance between the first electrode sheet 110 designated as "Y" and the second electrode sheet 120 designated as "Y+"; the capacitance Cuy denotes the capacitance between the conductive sheet 130 designated as "U" and the first electrode sheet 110 designated as "Y", the capacitance Cuy+ denotes the capacitance between the conductive sheet 130 designated as "U" and the second electrode sheet 120 designated as "Y+". Based on the serial connection and parallel connection, the relationship between the capacitance Cyy+ and the capacitances Cyy+', Cuy+ and Cuy is expressed as formula (3):

$$Cyy += Cyy+' + \left( \frac{1}{\frac{1}{Cuy} + \frac{1}{Cuy+}} \right) \quad (3)$$

Based on the above capacitance variations, the analysis unit 160 (illustrated in FIG. 2) can obtain the magnitude and direction of the force F1 applied to the multi-dimensional force sensing device 100 from the variation in the capacitance between the first electrode sheets 110 and the capacitances between the first electrode sheets 110 and the second electrode sheets 120.

Second Embodiment

Figure 8:
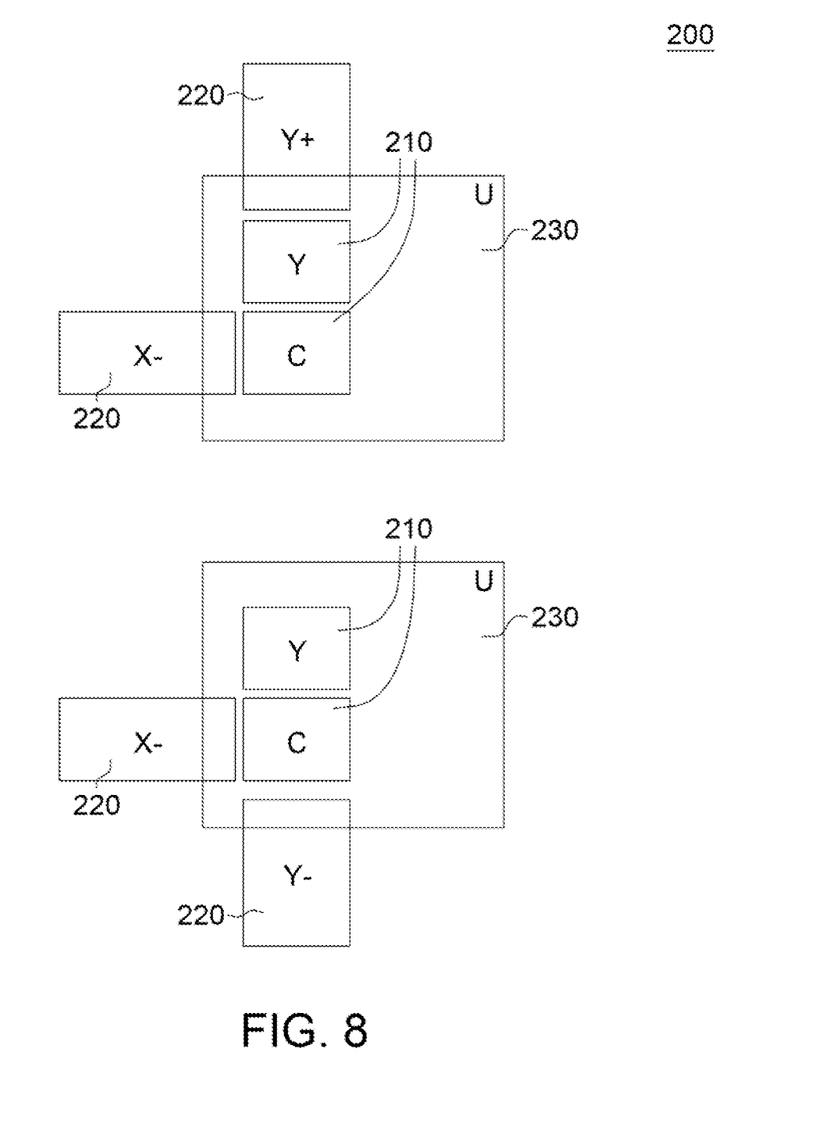
FIG. 8 shows a schematic diagram of a multi-dimensional force sensing device according to a second embodiment.

Referring to FIG. 8, a schematic diagram of a multi-dimensional force sensing device 200 according to a second embodiment is shown. The multi-dimensional force sensing device 200 of the present embodiment of the disclosure is different from the multi-dimensional force sensing device 100 of the first embodiment in the number of the first electrode sheets 210 and the number of the second electrode sheets 220, and other similarities are not repeated.

In the present embodiment of the disclosure, both the number of the second electrode sheets 220 and the number of the first electrode sheets 210 are 2, and the second electrode sheet 220 is disposed on any two adjacent sides of the first electrode sheet 210.

In the present embodiment of the disclosure, the analysis unit 160 (illustrated in FIG. 2) can obtain the magnitude and direction of the force applied to the conductive sheet 230 from the variation in the capacitance (such as the capacitance Ccy of the upper portion of FIG. 8) between the first electrode sheets 210 and the capacitance (such as the capacitance Ccx− or Cyy+ of the upper portion of FIG. 8) between the first electrode sheet 210 and the second electrode sheet 220, that is, the capacitance between two orthogonal axes.

Third Embodiment

Figure 9:
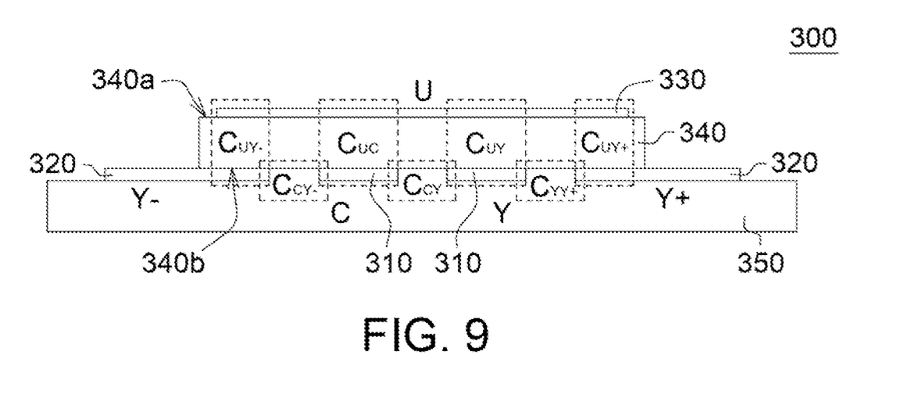
FIG. 9 shows a schematic diagram of a multi-dimensional force sensing device according to a third embodiment.

Referring to FIG. 9, a schematic diagram of a multi-dimensional force sensing device 300 according to a third embodiment is shown. The multi-dimensional force sensing device 300 of the present embodiment of the disclosure is different from the multi-dimensional force sensing device 100 of the first embodiment in a patterned soft laminose dielectric structure 340 and a substrate 350 for supporting the patterned soft laminose dielectric structure 340, and other similarities are not repeated. The soft laminose dielectric structure 340 of the present embodiment of the disclosure is patterned as an independent pattern sufficient to cover the conductive sheet 330. Consequently, the horizontal displacement of the multi-dimensional force sensing device 300 is increased, and the resolution of the device in the horizontal component is increased. In the present embodiment of the disclosure, the analysis unit 160 (illustrated in FIG. 2) can perform a procedure similar to that in the first embodiment to obtain whether a force is applied to the conductive sheet 330 as well as the magnitude and direction of the applied force.

Fourth Embodiment

Figure 10:
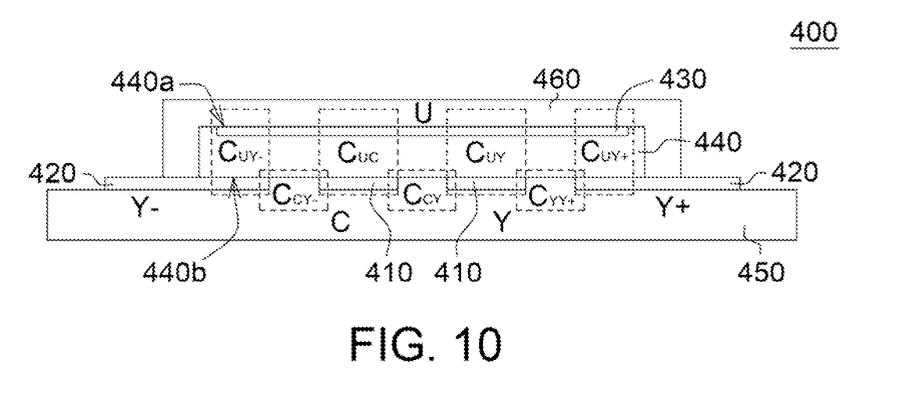
FIG. 10 shows a schematic diagram of a multi-dimensional force sensing device according to a fourth embodiment.

Referring to FIG. 10, a schematic diagram of a multi-dimensional force sensing device 400 according to a fourth embodiment is shown. The multi-dimensional force sensing device 400 of the present embodiment of the disclosure is different the multi-dimensional force sensing device 300 of the third embodiment in that the conductive sheet 430 can be formed in a groove of a soft upper cover 460, and the soft laminose dielectric structure 440 can be filled in the groove. The substrate 450 is attached on the soft upper cover 460. The first electrode sheet 410 is disposed between the substrate 450 and the soft upper cover 460. The soft upper cover 460 and the substrate 450 used for supporting the first electrode sheet 410 and the second electrode sheet 420 can be pasted and sealed together. The soft laminose dielectric structure 440 filled in the groove of the soft upper cover 460 can be realized by a gas, a liquid or a solid with elasticity, and other similarities are not repeated. In the present embodiment of the disclosure, the analysis unit 160 (illustrated in FIG. 2) obtains the magnitude and direction of the force applied to the conductive sheet 430 by judging the variation in the capacitance between the first electrode sheet 410 and the second electrode sheet 420.

Figure 11:
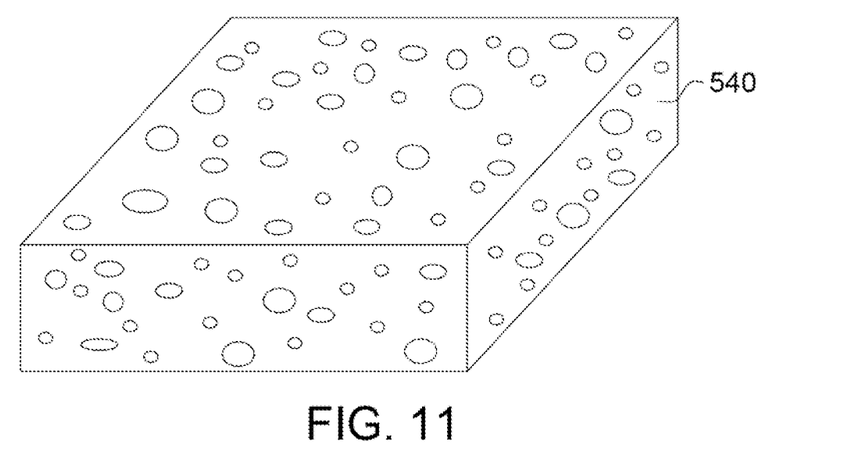
FIGS. 11 to 13 are schematic diagrams of various soft laminose dielectric structures.
Figure 12:
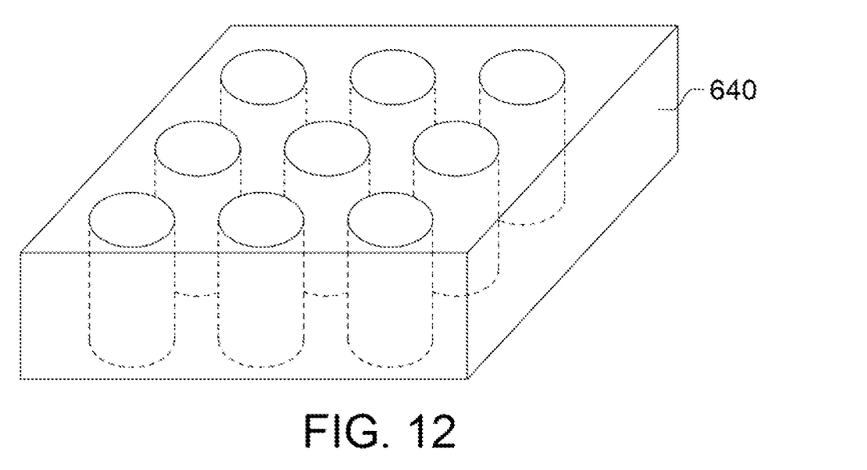
Figure 13:
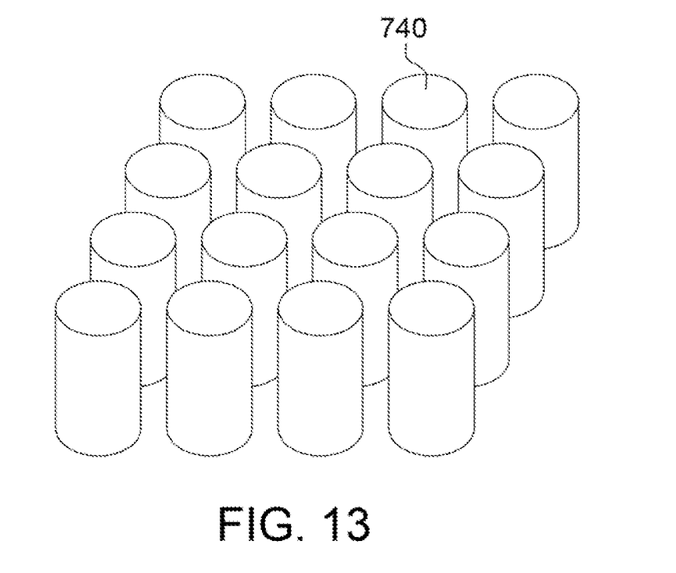

According to the above embodiments, the soft laminose dielectric structures 140, 340, 440 can be patterned, the soft laminose dielectric structure 440 of the embodiment of FIG. 10 can be realized by gas or liquid, and various implementations are still within the scope of protection of the disclosure. Referring to FIGS. 11 to 13, schematic diagrams of various soft laminose dielectric structures 540, 640, and 740 are shown. The soft laminose dielectric structures 540, 640, and 740, which add the deformation of force are realized by such as a foaming structure (as indicated in FIG. 11), a patterned micro-porous structure (as indicated in FIG. 12), or a patterned independent column structure (as indicated in FIG. 13).

Figure 14:
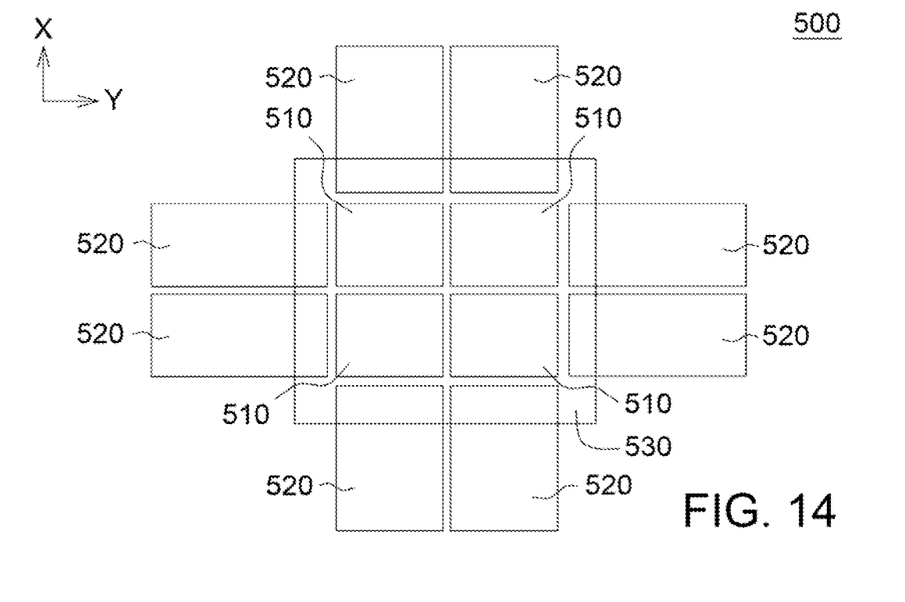
FIG. 14 shows a top view of a multi-dimensional force sensing device according to another embodiment.

In addition, the numbers of the first electrode sheets 110, 210, 310, and 410 and the numbers of the second electrode sheets 120, 220, 320, and 420 are not limited thereto. Referring to FIG. 14, a top view of a multi-dimensional force sensing device 500 according to another embodiment is shown. The number of the first electrode sheet 510 can be 4 (or above), and the number of the second electrode sheet 520 can be 8 (or above).

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A multi-dimensional force sensing device, comprising:
   a soft laminose dielectric structure having a first surface and a second surface opposite to each other;
   a conductive sheet disposed on the first surface, wherein the conductive sheet has a vertical projection area;
   at least one first electrode sheet disposed on the second surface, wherein the first electrode sheet is totally disposed in the range of the vertical projection area;
   at least one second electrode sheet disposed on the second surface, wherein the second electrode sheet is partially disposed in the range of the vertical projection area;
   a measuring unit used for measuring the capacitance generated between the first electrode sheet and the second electrode sheet; and
   an analysis unit for analyzing the magnitude and direction of a force applied on the conductive sheet according to the capacitance generated between the first electrode sheet and the second electrode sheet.

2. The multi-dimensional force sensing device according to claim 1, wherein a gap between the first electrode sheet and the second electrode sheet is totally disposed in the range of the vertical projection area.

3. The multi-dimensional force sensing device according to claim 1, wherein the number of the at least one second electrode sheet is greater than or equal to 2, and the measuring unit is used for measuring the capacitance between the second electrode sheets and the adjacent first electrode sheet.

4. The multi-dimensional force sensing device according to claim 3, wherein the second electrode sheets are disposed near adjacent lateral sides of the first electrode sheet.

5. The multi-dimensional force sensing device according to claim 1, wherein the number of the at least one first electrode sheet is greater than or equal to 2, and the measuring unit is used for measuring the capacitance between the adjacent first electrode sheets and for measuring the capacitance between the first electrode sheets and the adjacent second electrode sheet.

6. The multi-dimensional force sensing device according to claim 1, wherein the soft laminose dielectric structure is a patterned micro-porous structure or a patterned independent column structure.

7. A multi-dimensional force sensing device, comprising:
a soft upper cover having at least one groove;
a conductive sheet disposed on a bottom of the groove, wherein the conductive sheet has a vertical projection area;
a substrate attached on the soft upper cover;
at least one first electrode sheet disposed between the substrate and the soft upper cover, wherein the first electrode sheet is totally disposed in the range of the vertical projection area;
at least one second electrode sheet disposed between the substrate and the soft upper cover, wherein the second electrode sheet is partially disposed in the range of the vertical projection area;
a measuring unit used for measuring the capacitance generated between the first electrode sheet and the second electrode sheet; and
an analysis unit used for analyzing the magnitude and direction of a force applied on the conductive sheet according to the capacitance generated between the first electrode sheet and the second electrode sheet.

8. The multi-dimensional force sensing device according to claim 7, further comprising:
a soft laminose dielectric structure interposed in the groove of the soft upper cover.

9. The multi-dimensional force sensing device according to claim 7, wherein a gap between the first electrode sheet and the second electrode sheet is totally disposed in the range of the vertical projection area.

10. The multi-dimensional force sensing device according to claim 7, wherein the number of the at least one second electrode sheet is greater than or equal to 2, and the measuring unit is used for measuring the capacitance between the second electrode sheets and the adjacent first electrode sheet.

11. The multi-dimensional force sensing device according to claim 10, wherein the second electrode sheets are disposed near adjacent lateral sides of the first electrode sheet.

12. The multi-dimensional force sensing device according to claim 7, wherein the number of the at least one first electrode sheet is greater than or equal to 2, and the measuring unit is used for measuring the capacitance between the adjacent first electrode sheets and used for measuring the capacitance generated between the first electrode sheets and the adjacent second electrode sheet.

13. The multi-dimensional force sensing device according to claim 7, wherein the material of the soft laminose dielectric structure is liquid, gas, or elastic solid filled in the groove of the soft upper cover.

14. A multi-dimensional force sensing device, comprising:
a soft laminose dielectric structure having a first surface and a second surface opposite to each other;
a conductive sheet disposed on the first surface, wherein the conductive sheet has a vertical projection area;
a substrate attached on the second surface;
at least one first electrode sheet disposed on a surface of the substrate, wherein the first electrode sheet is disposed between the soft laminose dielectric structure and the substrate, and the first electrode sheet is totally disposed in the range of the vertical projection area;
at least one second electrode sheet disposed on the surface of the substrate, wherein the second electrode sheet is disposed between the soft laminose dielectric structure and the substrate, and the second electrode sheet is partially disposed in the range of the vertical projection area;
a measuring unit is used for measuring the capacitance generated between the first electrode sheet and the second electrode sheet; and
an analysis unit used for analyzing the magnitude and direction of a force applied on the conductive sheet according to the capacitance generated between the first electrode sheet and the second electrode sheet.

15. The multi-dimensional force sensing device according to claim 14, wherein a gap between the first electrode sheet and the second electrode sheet is totally disposed in the range of the vertical projection area.

16. The multi-dimensional force sensing device according to claim 14, wherein the number of the at least one second electrode sheet is greater than or equal to 2, the measuring unit is used for measuring the capacitance generated between the second electrode sheets and the adjacent first electrode sheet.

17. The multi-dimensional force sensing device according to claim 16, wherein the second electrode sheets are disposed near adjacent lateral sides of the first electrode sheet.

18. The multi-dimensional force sensing device according to claim 14, wherein the number of the at least one first electrode sheet is greater than or equal to 2, and the measuring unit is used for measuring the capacitance between the adjacent first electrode sheets and for measuring the capacitance between the first electrode sheets and the adjacent second electrode sheet.

19. The multi-dimensional force sensing device according to claim 14, wherein the soft laminose dielectric structure is an independent patterned structure covering the vertical projection area of the conductive sheet.

20. The multi-dimensional force sensing device according to claim 14, wherein the soft laminose dielectric structure is a patterned micro-porous structure or a patterned independent column structure.

21. A multi-dimensional force sensing method, comprising:
providing a multi-dimensional sensing device comprising a soft laminose dielectric structure, a conductive sheet, at least one first electrode sheet and at least one second electrode sheet, wherein the soft laminose dielectric structure has a first surface and a second surface opposite to each other, the conductive sheet is disposed on the first surface and has a vertical projection area, the first electrode sheet is disposed on the second surface and totally disposed in the range of the vertical projection area, and the second electrode sheet is disposed on the second surface and partially disposed in the range of the vertical projection area;

measuring the capacitance generated between the at least one first electrode sheet and between the first electrode sheet and the adjacent second electrode sheet; and providing a micro-processor for analyzing the magnitude and direction of a force applied on the conductive sheet according to the capacitance generated between the at least one first electrode sheet and between the first electrode sheet and the adjacent second electrode sheet.

22. The multi-dimensional force sensing method according to claim 21, wherein the number of the at least one second electrode sheet and the number of the at least one first electrode sheet are both greater than or equal to 2, and the step of measuring the capacitance generated between the at least one first electrode sheet and between the first electrode sheet and the adjacent second electrode sheet comprises:

measuring the capacitance generated between the adjacent at least one first electrode sheets; and measuring and the capacitance between the first electrode sheets and the adjacent second electrode sheet.

* * * * *